United States Patent [19]

Iwai et al.

[11] Patent Number: 4,656,878
[45] Date of Patent: Apr. 14, 1987

[54] ROTATION AXIS FINE ADJUSTMENT APPARATUS

[75] Inventors: Hideo Iwai; Fumitomo Kondo; Akio Kimura, all of Tokyo, Japan

[73] Assignee: Tokyo Kogaku Kika Kabushiki Kaisha, Tokyo, Japan

[21] Appl. No.: 770,183

[22] Filed: Aug. 28, 1985

[30] Foreign Application Priority Data

Sep. 1, 1984 [JP] Japan .............................. 59-132060[U]
Mar. 8, 1985 [JP] Japan .............................. 60-032998[U]

[51] Int. Cl.$^4$ .............................................. G12B 5/00
[52] U.S. Cl. .................................. 74/89.15; 74/99 R; 248/179; 33/285; 33/299
[58] Field of Search .................. 33/281, 282, 283, 284, 33/285, 299, 1 D, 1 N; 248/179; 74/89.15, 99 R; 350/566

[56] References Cited

U.S. PATENT DOCUMENTS

| 2,592,942 | 4/1952 | Moore .................................... | 33/299 |
| 3,093,904 | 6/1963 | Baker ..................................... | 33/285 |
| 4,084,327 | 4/1978 | Kool ...................................... | 33/299 |
| 4,108,407 | 8/1978 | Cable et al. .......................... | 248/179 |
| 4,202,110 | 5/1980 | Kool ...................................... | 33/299 |

FOREIGN PATENT DOCUMENTS

| 224927 | 12/1962 | Austria ................................... | 33/299 |
| 573431 | 6/1924 | France ................................... | 33/285 |

Primary Examiner—Cornelius J. Husar
Assistant Examiner—Eric K. Nicholson
Attorney, Agent, or Firm—Browdy and Neimark

[57] ABSTRACT

There is disclosed a rotation axis fine adjustment apparatus for finely adjusting rotation of a mounting portion rotatably mounted on a rotation axis with respect to a base portion through a fastening frame by suitably fastening and finely adjusting the rotation axis. It comprising an outer tube inserted in and fixed to the mounting portion with its end portion projecting outward; an intermediate hollow axial body formed at its outer peripheral surface with a flange portion and at its inner peripheral portion with a female thread portion, and inserted into inside of the outer tube and concentrically secured to the outer tube by screw means with the flange portion abutted against the end portion and other outer tubes kept being spaced apart from the outer tube; a fastening intermediate hollow axial body rotatably attached to an inner side of the outer tube at outside of the intermediate hollow axial body, and fixed at its one end with a fastening control handle; and a fine adjustment axial body formed with a male thread portion for being in threaded engagement with the female thread portion and reciprocally movably attached to an inner side of the intermediate hollow axial body in order to finely rotate the mounting portion, and coaxially fixed at its one end with a fine adjustment control handle with respect to the fastening control handle.

3 Claims, 8 Drawing Figures

FIG. 3(A)  FIG. 3(B)
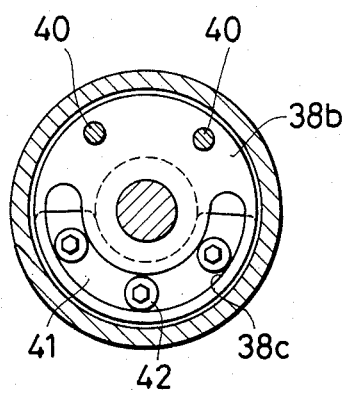
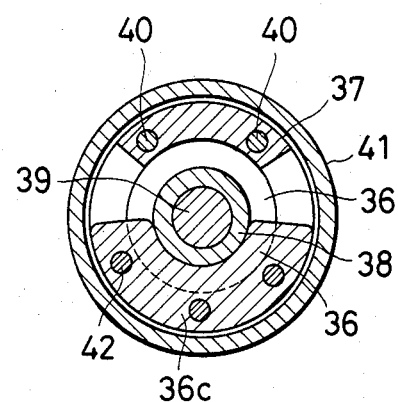
FIG. 4
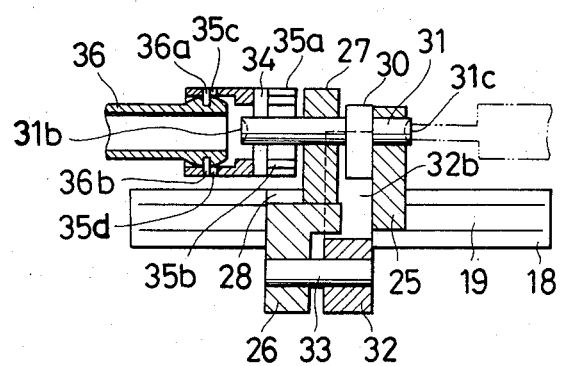

ROTATION AXIS FINE ADJUSTMENT APPARATUS

BACKGROUND OF THE INVENTION

1. Field of the Invention

This invention relates to a rotation axis fine adjustment apparatus for finely pivoting a rotation axis (or a pivot axis), and more particularly to a rotation axis fine adjustment apparatus in which a fine adjustment control handle and a fastening control handle are provided on a co-axis.

Conventional surveying equipment such as theodolites, levels, light wave range finders, etc. is provided with a rotation axis fine adjustment apparatus in order to permit a mounting portion supporting a telescope portion to be finely rotated around a horizontal axis or a vertical axis.

There is known a rotation axis fine adjustment apparatus of this type as disclosed, for example, in Japanese Utility Model Application No. 56(1981)-116700 filed in the same name of the present applicant, wherein a fastening control handle for tightening a fastening frame to a rotation axis and fasten its rotation, and a fine adjustment control handle for finely rotating a mounting portion fastened are provided on a co-axis. This type of a rotation axis fine adjustment apparatus employs a coaxial construction comprising a fine adjustment axial body having a male thread portion which is rotatable integrally with a fine adjustment control handle, and a fastening cylindrical body portion having a female thread portion for engaging with the male thread portion at its inner periphery which is rotated by operating a fastening control handle provided on a coaxis with the fine adjustment control handle.

However, in a rotation axis fine adjustment apparatus of this type, the female thread portion for engaging the male thread portion is integrally formed with the fastening control handle. After the fastening control handle is operated to permit it to be rotated integrally with the mounting portion, the fine adjustment handle is operated to effect a fine adjustment. At this time, there arises such a problem as that the fastening control handle itself is rotated due to the reaction force of the thread portion.

The present invention was accomplished in order to overcome the problem inherent in the related art.

SUMMARY OF THE INVENTION

It is therefore an object of the present invention to provide a rotation axis fine adjustment apparatus, wherein respective control handles are operated independently from each other, and operation of one control handle will not affect adversely to the other.

Another object of the invention is to provide a rotation axis fine adjustment apparatus which can be made compact in size, and wherein the number of component parts required is comparatively small.

In order to achieve the above objects, there is essentially provided a rotation axis fine adjustment apparatus for finely adjusting rotation of a mounting portion rotatably mounted on a rotation axis with respect to a base portion through a fastening frame by suitably fastening and finely adjusting the rotation axis comprising an outer tube inserted in and fixed to the mounting portion with its end portion projecting outward; an intermediate hollow axial body formed at its outer peripheral surface with a flange portion and at its inner peripheral portion with a female thread portion, and inserted into inside of the outer tube and concentrically secured to the outer tube by fixing means with the flange portion abutted against the end portion; a fastening intermediate hollow axial body rotatably attached to an inner side of the outer tube at outside of the intermediate hollow axial body, and fixed at its one end with a fastening control handle; and a fine adjustment axial body formed with a male thread portion for being in threaded engagement with the female thread portion and reciprocally movably attached to an inner side of the intermediate hollow axial body in order to finely rotate the mounting portion, and coaxially fixed at its one end with a fine adjustment control handle with respect to the fastening control handle.

Other objects and features of the present invention will become manifest to those well versed in the art upon making reference to the following detailed description of the preferred embodiment and the accompanying sheet of drawings.

BRIEF DESCRIPTION OF THE DRAWINGS

FIG. 3A is an enlarged sectional view taken along line IIIA—IIIA of FIG. 2;

FIG. 3B is an enlarged sectional view taken along line IIIB—IIIB of FIG. 2;

FIG. 4 is a sectional view, partly omitted, taken along line IV—IV of FIG. 2;

DETAILED DESCRIPTION OF THE EMBODIMENTS

Figure 1:
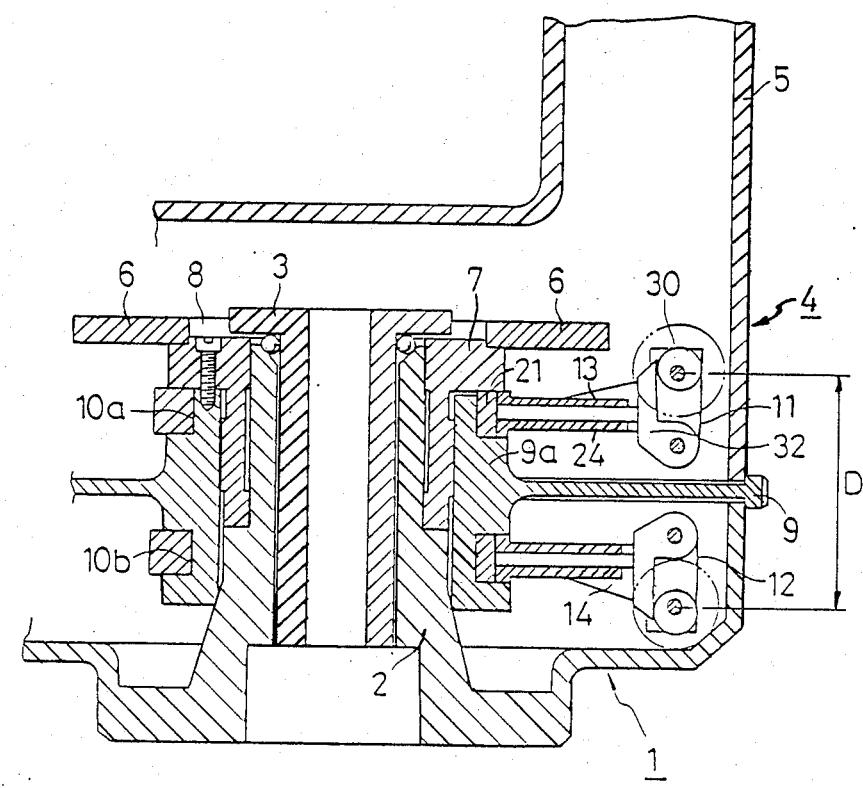
FIG. 1 is a partly vertically sectional view of a surveying equipment in which a fine adjustment apparatus according to one preferred embodiment of the present invention is incorporated.

FIG. 1 is a partly vertically sectional view of a mounting portion and a base portion of a surveying equipment in which a rotation axis fine adjustment apparatus according to the present invention is incorporated.

A mounting portion 4 having a mounting column 5 is pivotably axially supported by a stationary vertical shaft 2 provided on a base portion 1 through a rotatable vertical shaft 3. The column 5 axially pivotally supporting a collimator or light wave range finder portion (not shown) around its horizontal axis.

The mounting portion 4 is built therein with a scale board shaft 7 having a horizontal scale board 6 and pivotably axially supported by the stationary vertical shaft 2, and a scale board rotation circular plate 9 fixed to the scale board shaft 7 by a machine screw 8 inserted along the outer peripheral wall of the scale board shaft 7. The scale board rotation circular plate 9 is formed at its shaft portion 9a with annular grooves 10a, 10b. Fitted in these grooves 10a, 10b are respective fastening frames 13 and 14 of upper side fine adjustment apparatus 11 and lower side fine adjustment apparatus 12. The upper and lower fine adjustment apparatuses 11 and 12 are arranged as such that they are integrated with the mounting portion 4 to cause the horizontal scale board 6 to pivot, or even if the mounting portion 4 is pivoted, the horizontal scale board 6 is stopped, so that multiple angles can be surveyed at the time when horizontal angles are surveyed.

As shown in FIGS. 2 through 5, the fine adjustment apparatus 11 (since the fine adjustment apparatus 12 has the same constitution and same effect as that of the fine adjustment apparatus 11, description thereof will be made only with respect to the fine adjustment apparatus 11) generally comprises a fastening frame 13, a fastening portion 15, a fasten control portion 16, and a fine adjustment portion 17. The fastening frame 13 comprises a holding annular portion 18 and an arm portion 19. The holding annular portion 18 is fitted in the groove 10a formed in the shaft portion 9a of the scale board rotation circular plate 9. Also, the holding annular portion 18 is formed at a part of its inner periphery with a cut-out portion 20. A fastening piece 21 serving as a press member is inserted into the cut-out portion 20 for pressure-contacting the rotation shaft 3 in the perpendicular direction with respect to its axis in order to fasten the fastening frame 13 to this rotation shaft 3. The arm portion 19 is formed with a through-hole 23. One end portion of the through hole 23 is opened up at the cut-out portion 20 and the other end thereof is opened up at an terminal end 22 of the arm portion 19. In this through-hole 23, a push rod 24 is slidably inserted. The front end of the push rod 24 is abutted against a rear surface of the fastening piece 21.

Figure 5:
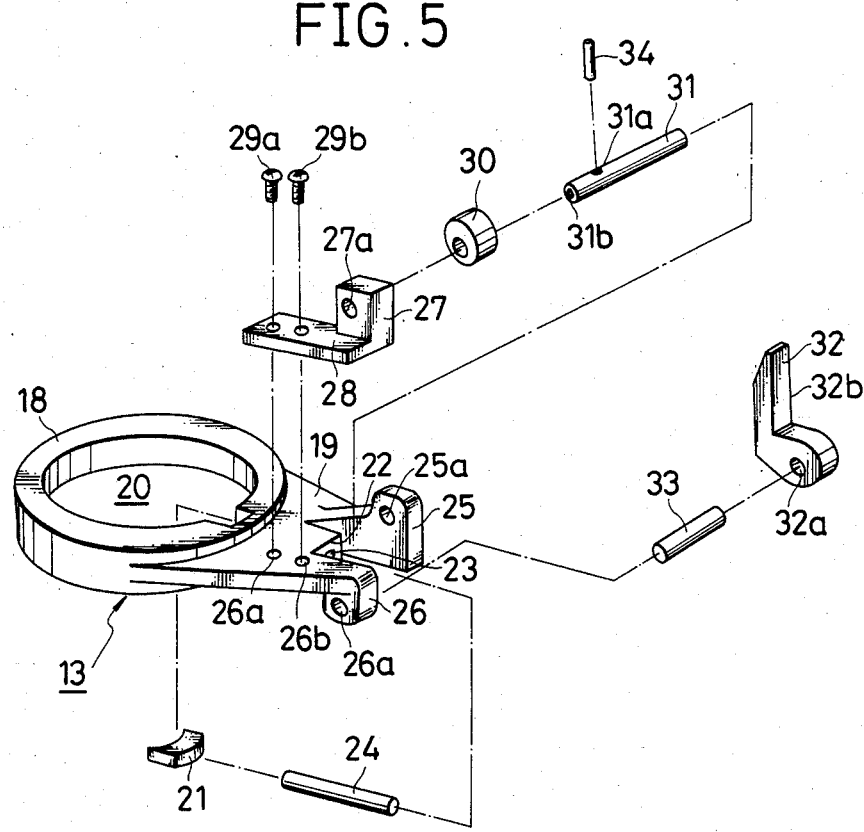
FIG. 5 is an exploded perspective view showing a relation between a fastening frame and component parts to be incorporated therein.

The terminal end portion 22 of the arm portion 19 is formed at its one side with a bearing portion 25 projecting upward and at its other side with a bearing portion 26 projecting downward (see FIGS. 4 and 5). A bearing member 28 having a bearing portion 27 projecting from its upper surface is attached to machine screw holes 26a, 26b formed in the upper surface of the arm portion 19 by threading machine screws 29a, 29b therein. A cam shaft 31 with an eccentric cam 30 attached thereto is pivotably inserted at its both ends in a bearing hole 25a of the bearing portion 25 and a bearing hole 27a of the bearing portion 27. Also, inserted in the bearing hole 26a of the bearing portion 26 is a shaft 33 pivotably attached with an L-shaped lever 32 having a hole 32a at its one end. The eccentric cam 30 is included in the fastening frame 13 with the cam 30 abutting against an inner wall surface 32b of the L-shaped lever 32. The cam shaft 31 is formed with a pin hole 31a in the perpendicular direction of the shaft 31, in which a pin 34 is inserted therethrough. The pin 34 is slidably engaged in cut-out grooves 35a and 35b in the axial direction of a cylindrical tube 35.

The above-mentioned push rod 24, L-shaped lever 32, eccentric cam 30 and cylindrical tube 35 constitute the fastening portion 15. Elongated slots 35c and 35d are axially formed in the cylindrical tube 35 at the opposite side to the grooves 35a, 35b while extending in the same direction as that connecting these grooves 35a, 35b.

Figure 2:
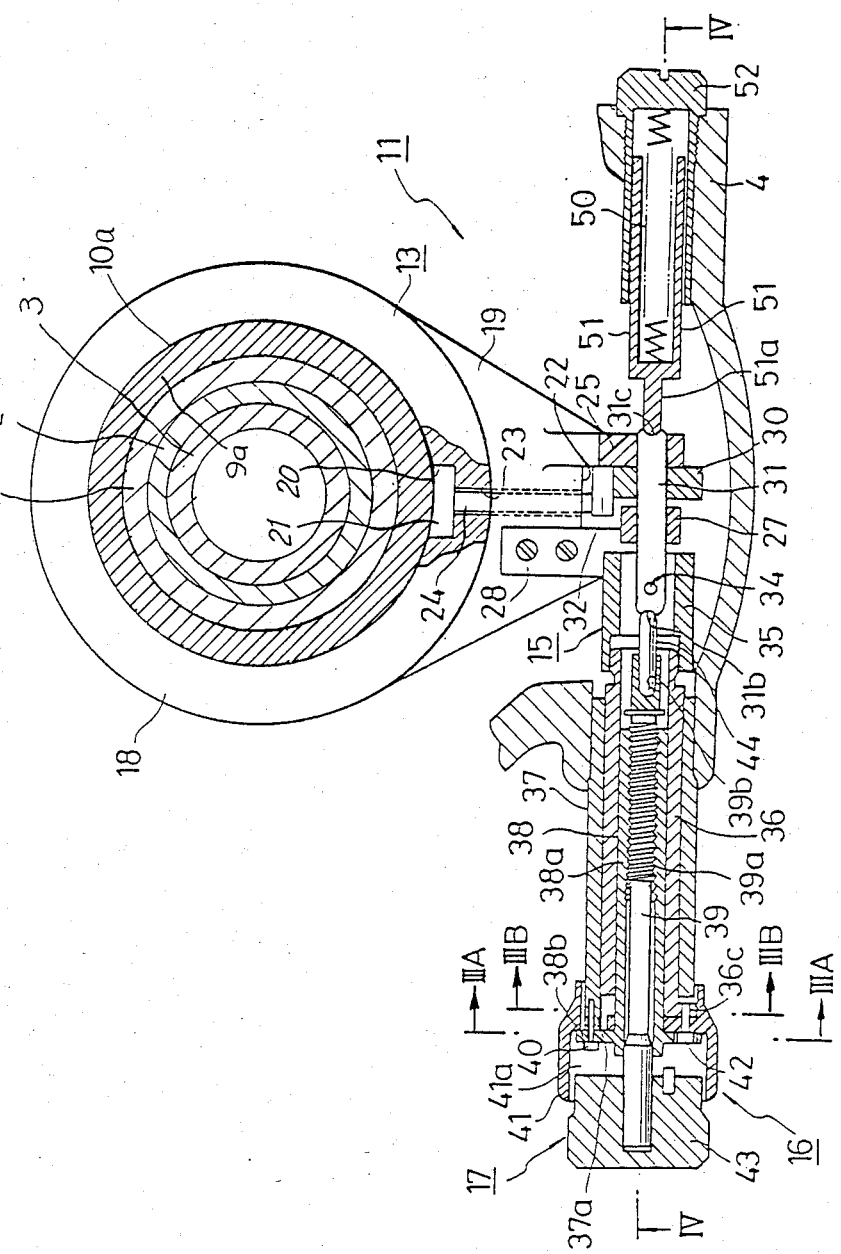
FIG. 2 is a horizontal sectional view of the fine adjustment apparatus according to one embodiment of the present invention.

On the other hand, an outer tube 37 is, as shown in FIG. 2, inserted in and fixed to the mounting portion 4 with its end portion 37a projecting outward. In the outer tube 37, a fastening hollow axial body 36, an intermediate hollow axial body 38 and a fine adjustment axial body 39 are coaxially provided one after another. The intermediate hollow axial body 38 is formed at a location near to one end thereof with a flange portion 38b and at its inner peripheral surface with a female thread portion 38a The intermediate hollow body 38 is concentrically fixed with the outer tube 37 by screw means 40, with its flange portion 38b abutted against the end portion 37a of the outer tube 37 and the remaining portion kept being spaced apart from the outer tube 37. Moreover, the fastening hollow axial body 36 is rotatably attached to outside of the intermediate hollow axial body 38 and inside of the outer tube 37. A fastening control handle 41 is fixed to one end of the fastening hollow axial body 36. More specifically, the fastening control handle 41 is abutted and fixed to an end face of a fan-shaped flange of the fastening hollow axial body 36 by screw means 40 inserted in an annular groove 38c of the flange portion 38b with heads thereof positioned on the groove 38c.

The intermediate hollow axial body 38 abuts its flange portion 38b against the end portion 37a of the outer tube 37 inserted in outside of the fastening hollow axial body 36 and is fastened tight by screw means 40 in the axial direction of the outer tube 37. In this embodiment, the intermediate hollow axial body 38 is secured at two spaced apart spots at the end portion 37a of the outer tube 37 using screw means 40.

Figure 6:
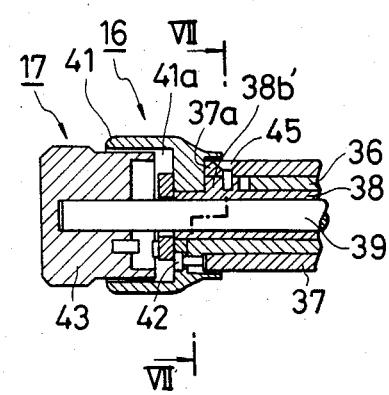
FIG. 6 is a sectional view of an important portion of a modified embodiment of a fine adjustment apparatus which corresponds to a part of FIG. 2.
Figure 7:
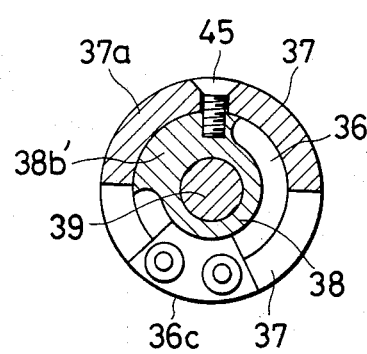
FIG. 7 is a sectional view taken along line VII—VII of FIG. 6.

A modified embodiment of this portion is shown in FIGS. 6 and 7. In order to fix the intermediate hollow axial body 38 which is to be concentrically provided with respect to the outer tube 37 to the outer tube 37, the flange portion 38b' of the intermediate hollow axial body 38 is projected in the radial direction to the extent enough for the fastening hollow axial body 36 to rotate, and an inner peripheral surface of the outer tube 37 is abutted thereagainst for being fixed by screw means 45 in the radial direction.

By the way, fixture of the intermediate hollow axial body 38 to the outer tube 37 in the radial direction by screw means 45 can be performed accurately and with ease, if the dimensions and shapes of the outer tube 37 and the flange portion 38b' are formed correctly. On the other hand, in the case the intermediate hollow axial body 38 is to be secured to the outer tube 37 by screw means 40 from the axial direction, the concentric tube or shafts 37 and 38 are secured not in the state that they are pulled in the radial direction or in an eccentric state. Moreover, since screw means 40 having a long thread portion in the axial direction and a flat area under the neck of its head portion can be used, the end portion 37a of the outer tube 37 can be correctly abutted against the flange portion 38b of the intermediate hollow axial body 38 without axes thereof being not in alignment. In this way, the intermediate hollow axial body 38 can be secured to the outer tube 37 while coaxial alignment is being performed.

The fastening hollow axial body 36 is rotatably disposed between the outer tube 37 and the intermediate hollow axial body 38, and formed on the outer peripheral surface of its one end with a spherical seat portion, in which pins 35a, 36b are planted loosely penetrating slots 35c, 35d formed in the cylindrical tube 15, respectively. The other end of the fastening hollow axial body 36 is partly abutted against the fastening control handle 41, as shown in FIG. 2. As shown in FIG. 3B, a fan-shaped flange 36c is extended so far as the outer periphery of the outer tube 37. And, the fastening hollow axial body 36 is permitted to move rotatably within the range where both ends of the fan-shaped flange 36c are abutted with both ends of a projected portion 38b of the intermediate hollow axial body 38. The fastening control handle 41 which permits the fine adjustment axial body 39 and the intermediate hollow axial body 38 to penetrate therethrough is fixed to the flange 36c from the axial direction by three bolts 42. The fine adjustment axial body 39 is formed at its intermediate portion with a male thread portion 39a for engaging the female thread portion 38a of the intermediate hollow axial body 38. One end of the fine adjustment axial body 39 is formed with an axial hole 39b in the axial direction, and the other end thereof projecting from the center of the fastening control handle 41 is attached with a fine adjustment control handle 43. This fine adjustment control handle 43 is inserted in a recess 41a of the fastening control handle 41 in order to make the apparatus compact. An assembly of the fastening control handle 41 and the fine adjustment control handle 43 is fixed by the outer tube 37 press-fit in the mounting portion 4 with its end portion 37a projecting outward. The fine adjustment axial body 39 and the cam shaft 31 are inter-connected by a push pin 44 inserted at its front end in the axial hole 39b and a recess 31b formed therein respectively. A front end portion 51a of a piston 51 with a spring 50 built therein and depressed abuts against a recess 31c at the other end of the cam shaft 31 to press and energize the cam shaft 31, i.e., the fastening frame 13 so that it will rotate toward the fine adjustment axial body 39 side. This pressing force can be adjusted by controlling the depth of insertion of a cap 52 having a thread for reciprocally moving the piston 51.

Nextly, operation of the invention will be described. To begin with, the fastening control handle 41 is kept in its loosened state. Then, the mounting portion 4 on which a collimator, etc. are mounted is largely pivoted to bring it to a desired position. At this time, the fine adjustment apparatus is connected with the mounting portion 4 at its both sides, though not rigidly bonded thereto. contact, and so rotated integrally with the mounting portion 4. Then, the fastening control handle 41 is turned to cause the fastening hollow axial body 36 to pivot around the intermediate hollow axial body 38, and to pivot the cylindrical tube 35, cam shaft 31, and L-shaped lever 32, so that the fastening piece 21 is brought to be in press contact with the shaft portion 9a of the scale board rotation circular plate 9 through the push rod 24. The press contact of the fastening piece 21 causes the fastening frame 13 to be fastened to the scale board rotation circular plate 9, thereby causing the whole apparatus to be fixed.

Subsequently, upon rotation of the fine adjustment control handle 43, the fine adjustment axial body 39 presses the push pin 44 by progress of engagement between the male thread portion 39a and the female thread portion 38a. Since the fastening frame 13 is not moved due to fastening, the cam shaft 31 is not moved either. Accordingly, the reaction force is transmitted from the female thread portion 38a, through the intermediate hollow axial body 38 and the outer tube 37, to the mounting portion 4. As a result, the mounting portion 4 is finely rotated with respect to the shaft portion 9a of the scale board rotation circular plate 9 or the base portion 4. Due to fine rotation of the mounting portion 4, collimation of, for example, a collimator can be correctly adjusted. Since the fastening handle and the fine adjustment handle is provided on a coaxis, adjustment can be made by one hand and simply by finger operation in a same position. In operation of these handles 41 and 43, the fastening hollow axial body 36 and the fine adjustment axial body 39 can be operated independently from each other and without any adverse affection received from each other, since the intermediate hollow axial body 38 is used as a bearing or a reaction force receiver.

In order to move the push rod 24, an eccentric cam may be directly used. Alternatively, by interposing an L-shaped lever 32 as mentioned above, in a surveying equipment having upper and lower fine adjustment apparatuses as shown in FIG. 1, when the fine adjustment apparatuses are constituted as such that the L-shaped levers will be formed symmetric, inspite of the existence of the fastening frame in a known position, an arrangement distance D between the units of the fine adjustment handle and the fastening handle of the respective upper and lower fine adjustment apparatuses can be made large. Thus, a fine adjustment apparatus with an excellent performance can be obtained.

Although, in this embodiment, a fastening piece 21 is used in order to fasten the fastening frame of the rotation shaft, the present invention is not limited to it. Otherwise, instead of the eccentric cam and push rod, a crank mechanism and gear means or other cam associating mechanism may of course be used for actuating the pressure contacting member. Also, in the embodiment, description is made on a fine adjustment apparatus for a rotation vertical axis. However, the present invention is not limited to it. The present invention can of course be used as a fine adjustment apparatus for a horizontal rotation axis for elevation angles. The invention is not limited to a surveying equipment, either. It can be used for any other equipment which has a rotation axis in a broad sense such as, for example, an optical dividing apparatus, the axis of which requires to be finely pivoted.

Furthermore, in the preferred embodiment, the intermediate hollow axial body is concentrically fixed to the outer tube by tightening the screw in the axial direction. Accordingly, centering adjustment can be obtained. Moreover, even fixed, they are not brought to be out of alignment, and the axes are not inclined with respect to each other. Accordingly, concentric tubes or shafts 37 and 38 are secured not in the state that they are pulled in radial direction or in an eccentric state. Thus, smooth rotation is obtained without irregular resistance depending on position of rotation.

As described in the foregoing, according to the present invention, a rotation axis fine adjustment apparatus for finely adjusting rotation of a mounting portion rotatably mounted on a rotation axis with respect to a base portion through a fastening frame by suitably fastening and finely adjusting the rotation axis comprising an outer tube inserted in and fixed to the mounting portion with its end portion projecting outward; an intermediate hollow axial body formed at its outer peripheral surface with a flange portion and at its inner peripheral portion with a female thread portion, and inserted into inside of the outer tube and concentrically secured to the outer tube by fixing means with the flange portion abutted against the end portion; a fastening intermediate hollow axial body rotatably attached to an inner side of the outer tube at outside of the intermediate hollow axial body, and fixed at its one end with a fastening control handle; and a fine adjustment axial body formed with a male thread portion for being in threaded engagement with the female thread portion and reciprocally movably attached to an inner side of the intermediate hollow axial body in order to finely rotate the mounting portion, and coaxially fixed at its one end with a fine adjustment control handle with respect to the fastening control handle. Thus, there is obtained such a desirable rotation axis fine adjustment apparatus which is compact in size and requires only small number of component parts, and in which the respective control handles are operated independently from each other and therefore no adverse affection is given to each other.

What is claimed is:

1. A rotation axis fine adjustment apparatus for finely adjusting rotation of a mounting portion mounted around a shaft portion to be rotatable with respect to a base portion through a fastening frame by suitably fastening and finely adjusting the fastening frame relative to the rotation axis comprising:

an outer tube inserted in and fixed to the mounting portion with its end portion projecting outside the mounting portion;

an intermediate hollow axial body formed at the outer peripheral surface thereof with a flange portion and at the inner peripheral portion thereof with a female thread portion, said hollow axial body being disposed inside of said outer tube and concentrically secured to said outer tube by fixing means such that said flange portion abuts against said end portion;

a fastening intermediate hollow axial body rotatably arranged inside of said outer tube and outside of said intermediate hollow axial body, an outer end of said fastening intermediate hollow axial body being provided with a fastening control handle; and a fine adjustment axial body formed with a male thread portion for being in reciprocally movably threaded engagement with the female thread portion of said intermediate hollow axial body and provided at an inner side of said intermediate hollow axial body in order to finely rotate said mounting portion, an outer end of said fine adjustment axial body being provided with a fine adjustment control handle coaxially with respect to said fastening control handle.

2. A rotation axis fine adjustment apparatus as claimed in claim 1, wherein said intermediate hollow axial body is fixed to said outer tube with the flange portion of said intermediate hollow axial body abutted against one end portion of the outer tube from an axial direction of the outer tube, and fixed thereto in the axial direction by fixing means.

3. A rotation axis fine adjustment apparatus as claimed in claim 1, wherein said intermediate hollow axial body is fixed to the outer tube with the flange portion of said intermediate hollow axial body abutted against the end portion of the outer tube from the radial direction of the outer tube, and fixed thereto in the radial direction by fixing means.

* * * * *